Nov. 9, 1943.  E. C. RANEY  2,333,819
CONTROL APPARATUS
Filed Dec. 19, 1940  2 Sheets-Sheet 1
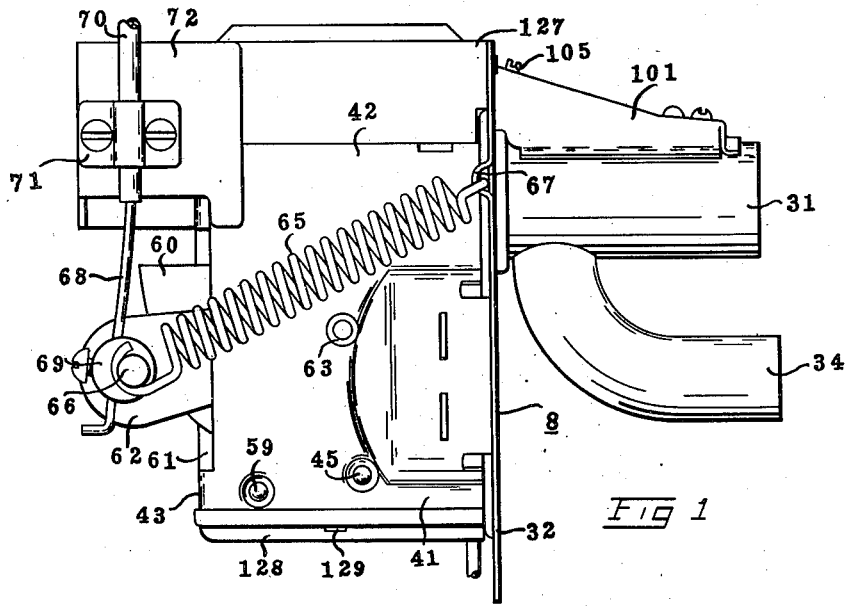
Fig 1
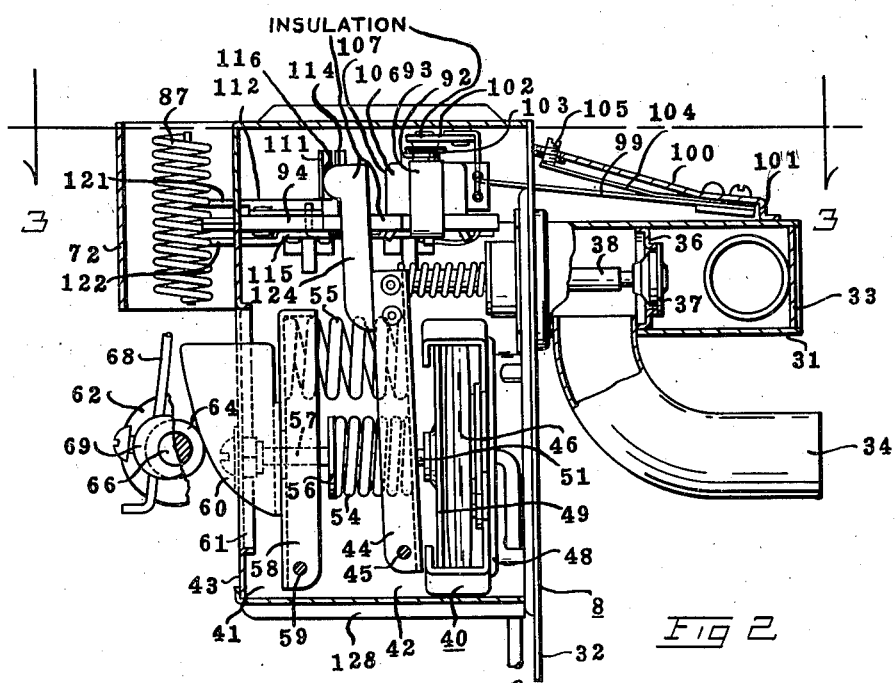
Fig 2
INVENTOR
Estel C. Raney
BY
Warren H. F. Schmidt
ATTORNEY Nov. 9, 1943.   E. C. RANEY   2,333,819
CONTROL APPARATUS
Filed Dec. 19, 1940   2 Sheets-Sheet 2
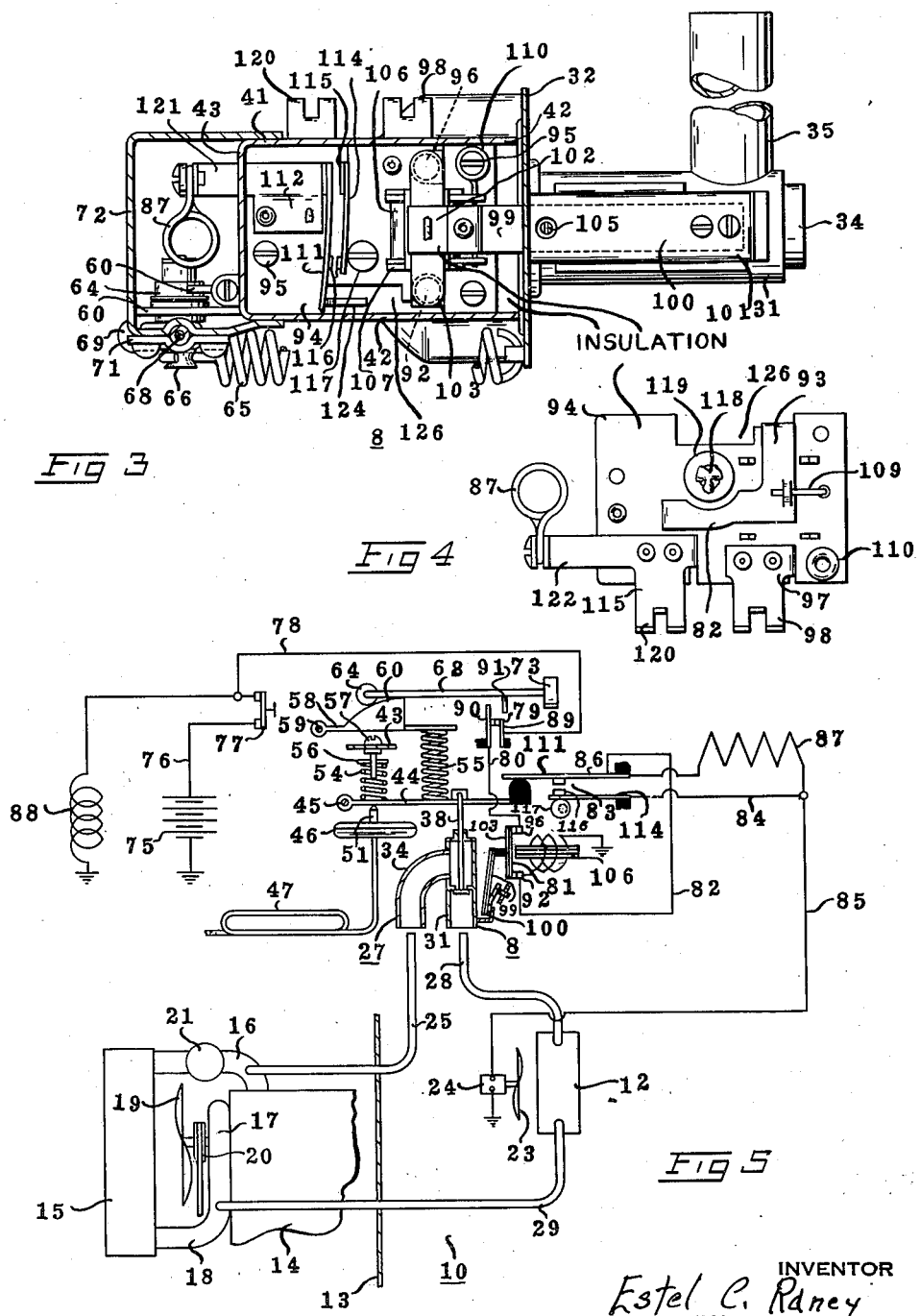
INVENTOR
Estel C. Raney
BY
ATTORNEY Patented Nov. 9, 1943

2,333,819

UNITED STATES PATENT OFFICE 2,333,819

CONTROL APPARATUS

Estel C. Raney, Columbus, Ohio, assignor to Ranco Incorporated, Columbus, Ohio, a corporation of Ohio Application December 19, 1940, Serial No. 370,907

9 Claims. (Cl. 236—37)

The present invention relates to control apparatus for a heat exchange system and more particularly to control apparatus for a heating system.

An object of the present invention is to provide a control apparatus for a heat exchange system in which a heat exchange fluid is circulated through a heat exchanger and in which a medium is directed over the exchanger and into a compartment, which apparatus causes the medium to be circulated over the heat exchanger only when the heat exchange fluid has attained a predetermined minimum temperature and causes a reduction in the rate of circulation of the medium over the heat exchanger when the temperature of the medium in the compartment has reached a predetermined degree.

Another object of the invention is to provide a control apparatus for initiating the circulation of the medium over the exchanger only when the temperature of the heat exchange fluid has reached a predetermined degree and to maintain the circulation of the medium thereafter regardless of variations in temperature of the heat exchange fluid and until the heat exchange system is rendered inoperative.

Another object of the invention is to provide a valve for controlling the flow of the heat exchange fluid through the exchanger and to control the valve by mechanism responsive to the temperature of the medium of the compartment and to also control the rate of circulation of the medium over the exchanger by the mechanism that controls the valve.

Other and further objects and advantages will be apparent from the following description, reference being had to the accompanying drawings wherein a preferred form of embodiment of the present invention is clearly shown.

In the drawings:

Fig. 1 is a side view in elevation of a control apparatus for a heating system;

Fig. 2 is a side view, partly in section, of the apparatus shown in Fig. 1;

Fig. 3 is a view in section, the section being taken on line 3—3 of Fig. 2;

Fig. 4 is a bottom view in elevation of a terminal panel for the control apparatus; and Fig. 5 is a diagrammatic view of a heating system for heating the interior of an automobile passenger compartment.

Although the invention might be incorporated in different types of heat exchange systems, for the purpose of illustrating one form of the invention, I have shown a control apparatus, indicated generally at 8, for controlling a heating system 10, which system is adapted to heat the interior of an automobile passenger compartment.

The heating system 10 comprises an air heater 12 which is located inside the passenger compartment of the automobile. One wall of the passenger compartment is indicated at 13. An internal combustion engine for driving the automobile is indicated at 14. The cooling system for the engine 14 includes a radiator 15 connected to the outlet of the water jacket of the engine by a pipe 16 and the outlet of the radiator 15 is connected to a water pump 17 by a pipe 18. A fan 19 is provided adjacent the radiator 15 for drawing air through the radiator. The fan is driven by a pulley 20 connected with the drive shaft of the engine by a belt. The water pump 17 is also driven by the pulley 20 and withdraws water from the radiator and directs it into the cooling jacket of the engine for circulating the water of the cooling system for the engine through the radiator 15. Preferably a thermostatic device, indicated at 21, is connected in the pipe 16 to prevent passage of water to the radiator 15 until the temperature of the water in the water jacket is raised to approximately 150 degrees F.

The air heater 12 is of the well known hot water type, having a core through which hot liquid is circulated. A fan 23, driven by an electric motor 24, circulates the air within the compartment over the core of the heater for warming the air in the compartment. It is to be understood that air from outside the compartment could be directed over the heater 12 and into the compartment without departing from the scope of the invention. The inlet of the heater core is connected with the pipe 16 by a pipe 25, valve 27 of the apparatus 8 and pipe 28. The outlet of the heater core is connected to the pipe 18 by a pipe 29. Thus, hot liquid from the cooling system of the engine 14 can be circulated through the core of the heater 12 by the pump 17.

The valve 27 comprises a tubular member 31 that is attached at one end to the plate 32, which forms one wall of the casing for the control apparatus 8. The opposite end of the tubular member 31 is closed by a wall 33. A tube 34 is connected to the member 31 for forming an inlet coupling for connecting the valve with the pipe 25 and a tube 35 is connected to the tubular member 31 for forming an outlet coupling with the pipe 28, which pipe leads to the core of the heater 12. A valve seat 36 is provided in the tubular member 31 and a valve member 37 is arranged to close the opening in the valve seat for controlling the flow of liquid to the core of the heater 12 through the pipes 25 and 28.

The valve member 37 is operated by a valve stem 38 which is supported by a bushing, not shown, and extends from the tubular member 31 and through an opening in the plate 32. A suitable hermetic seal, not shown, is provided between the stem 38 and the walls of the tubular member 31 for preventing leakage of fluid while permitting reciprocating movement of the valve stem. This seal may be formed similar to the seal shown in my co-pending application, Serial No. 370,906, filed December 19, 1940, which application also discloses a mechanism similar to the valve mechanism thus far described.

The valve stem 38 is operated by a thermal responsive mechanism indicated generally at 40. This mechanism 40 is enclosed in and supported by a U shaped frame 41 having side walls 42 and a yoke wall 43. The end edges of the walls 42 are attached to the plate 32 by suitable devices, not shown. A lever 44 is pivoted between the walls 42 by a pin 45 which is suspended in bearings formed in the walls 42. The free end of the lever 44 is pivotally connected to the end of the stem 38, so that as the lever is rotated about its pivot, the valve member 37 will be moved to and from the valve seat. The lever 44 is adapted to be moved to the valve closing position by an expansible wafer type diaphragm 46. The diaphragm 46 is preferably formed by two spaced flexible walls sealed together about the edges thereof. A tube 47 is connected at one end thereof with one of the walls of the diaphragm and communicates with the interior of the diaphragm, and the opposite end of the tube is closed. The tube and diaphragm are filled with a thermal responsive fluid, for example, sulphur dioxide vapor, so that the pressure in the diaphragm will vary as the temperature of the coolest portion of the tube varies. The diaphragm 46 is suitably mounted on a plate 48 and the plate 48 is supported between the walls 42 of the frame 41. A plate 49 is carried on one of the walls of the diaphragm and a rod 51 extends from the plate to the lever 44 for transmitting movement of the walls of the diaphragm to the lever 44. The tube 47 is extended outwardly from the control apparatus through an opening in the frame 41 and the end of the tube 47 is coiled as at 52 and mounted on a suitable bracket 53. It is apparent that when the coil 52 is located in a zone, the temperature of which is lower than the temperature of the diaphragm 46, the pressure in the diaphragm will correspond to the pressure of the sulphur dioxide in the coil 52, which pressure is the function of the temperature at the coil. The thermostatic mechanism described is similar to that disclosed in my application mentioned above.

The lever 44 is urged in the valve opening direction by a compression spring 54 and a compression spring 55. The tension of the spring 54 is adjusted by a device comprising a washer 56 threaded on a screw 57, which screw is suitably mounted for rotation on the wall 43 of the frame 41. The screw 57 is disposed axially with respect to the spring 54, and by rotating the screw, the washer 56 is moved for changing the tension of the spring. The spring 54 is provided for initially establishing the temperature range of the thermostatic mechanism when the apparatus is set at the factory.

The spring 55 is interposed between the lever 44 and a lever 58, which lever is pivoted between the walls 42 by a pin 59. The lever 58 is provided with a cam 60 which extends through a slot 61 formed in the wall 43 of the frame 41. A lever 62 is pivoted to one of the walls 42 of the frame 41 by a suitable pivot 63 and a roller 64 is mounted on the end of the lever 62, which roller engages the periphery of the cam 60. When the lever 62 is moved about its pivot, the roller 64 operates the cam for changing the position of the lever 58, thereby adjusting the tension of the spring 55. A spring 65 is connected at one end of the lever 62 by a pin 66 and the opposite end thereof is attached to an eyelet 67 formed on the plate 32. The spring 65 is arranged to be disposed on one side of the pivot 63 for the lever 62 for continually biasing the lever 62 in a clockwise direction. The reaction of the spring 55 on the lever 58 operates through the cam 60 and counterbalances the biasing effect of the spring 65 so that the lever 62 will remain in any position to which it is moved. A wire 68 is connected to the lever 62 by a screw clamp 69, so that the tension of the spring 55 may be varied from a distant point by reciprocating the wire 68. The wire 68 is preferably encased in a cable guide 70 which is anchored to an inverted U shaped member 72 by a bracket 71. The open end of the member 72 is attached to the walls 42 of the frame 41 by welding. Preferably a knob 73 is attached to the end of the wire 68 and is located on the steering wheel post of the automobile. It is apparent that by increasing and decreasing the tension of the spring 55, the valve will be caused to open in response to a decrease and increase, respectively, of the pressure within the diaphragm 46. Thus the temperatures at which the valve is opened can be adjusted by the knob 73.

Preferably the control apparatus 8 is mounted on the front side of the instrument panel of the automobile and the bracket 53, on which the coil 52 of the tube 47 is wound, is mounted on the instrument panel adjacent the windshield of the automobile. The tension of the spring 55 is adjusted so that when the temperature at the coil 52 falls to 72 degrees, for example, the valve will commence to open, due to the decrease in vapor pressure in the diaphragm 46, and liquid from the cooling system will flow through the core of the heater 12. As the temperature of the air in the passenger compartment rises, the vapor pressure in the diaphragm 46 will increase and cause the valve to move toward the closed position and throttle the flow of liquid through the core of the heater 12.

When the passenger compartment and the liquid in the cooling system of the automobile engine 14 are cold and the engine of the automobile is started, the liquid which initially flows through the core of the heater 12 will be below the temperature desired in the passenger compartment and it will not heat the air in the passenger compartment. Until the liquid passing through the core of the heater 12 is sufficiently warm to heat air directed over the heater, it is desirable to cause the fan 23 to be inoperative for preventing cold drafts from being blown over the occupants of the compartment. After the temperature of the liquid flowing through the heater 12 rises to a degree which is adequate for heating air directed over the heater 12, it is desirable to operate the fan 23 at a high rate of speed for rapidly circulating the air in the passenger compartment over the heater for quickly increasing the temperature in the compartment.

Then, after the air is warmed to approximately the temperature at which it is desired to maintain the passenger compartment, it is desirable to reduce the speed of the fan 23 for causing circulation of air over the heater 12 at a moderate rate.

The control apparatus 8 includes mechanism for controlling the fan motor 24 for causing the desirable operation of the heating system mentioned above. The fan motor 24 is energized by a circuit that includes a battery 75, wire 76, switch 77, wire 78, switch 79, wire 80, switch 81, conductor 82, switch 83, conductors 84 and 85, motor 24 and to ground. A second circuit for the fan motor 24 is formed, when the switch 83 is opened, by conductor 86 and a resistance element 87, which resistance element is connected intermediate the conductors 86 and 85.

Preferably the switch 77 is a manually operated switch and it also controls the ignition circuit for the engine, which circuit is indicated generally at 88, so that the circuit for the motor 24 is deenergized when the engine is stopped.

The switch 79 comprises two contacts normally biased together by two spring members 89 and 90. The wire 68 for adjusting the tension of the spring 55 is provided with a lug 91 which is arranged to engage the end of the spring 90 and separate the contacts of the switch 79 when the wire 68 is moved to the position for causing a minimum tension of the spring 55 on the lever 44. Thus, when the control apparatus is set for producing a minimum temperature in the passenger compartment, the fan motor 24 will be deenergized by the switch 79 and air will not be circulated over the heater 12 by the fan 23.

The switch 81 is responsive to the temperature of the liquid flowing through the valve 27. This switch comprises a fixed contact 92 which is mounted on a bracket 93 attached to a panel 94. The panel 94 is formed of insulating material and is secured to the frame 41 by screws 95 threaded in lugs formed by turned portions of the walls of the frame 41. A second fixed contact 96 is mounted on a bracket 97, which bracket is also attached to the panel 94. The bracket 97 is formed having a terminal post 98, and the wire 80 is attached to this terminal post. A bimetal strip 99 is attached to a wall 100 of a cover 101, which cover is brazed to the tubular member 31. An insulating member 102 is riveted to the end of the strip 99, which end is offset from the strip, and a contact bar 103 is attached to the insulating member 102. The contact bar 103 preferably comprises an iron bar having a copper strip along one surface thereof and silver contacts riveted at each end of the bar by copper rivets, which rivets form an electrical contact between the contacts and the copper strip. The contacts on the bar 103 are adapted to engage the contacts 92 and 96, respectively. When the temperature of the bimetallic strip 99 increases, the end of the strip tends to move the bar 103 to the contacts 92 and 96 for closing the switch 81.

A spring strip 104 is interposed between the wall 100 of the cover 101 and the bimetal strip 99, and a portion of the strip 104 is turned outwardly from the strip 99 and is biased against the end of an adjusting screw 105 which is threaded in a lug which is turned outwardly from wall 32. By rotating the screw 105, the position of the strip 104 may be changed and this strip changes the position of the bimetal 99 with respect to the fixed contacts of the switch 81. Thus, the temperature at which the bimetal closes the switch 81 can be adjusted by the screw 105.

An electromagnet 106 is mounted on the panel 94 between the contacts 92 and 96 of the switch 81. The electromagnet has a core formed by an iron rod having plates 107 connected at each end thereof. The coil of the magnet is wound about the iron bar and insulated from the plates 107 by suitable insulation. One end of the coil of the magnet is connected with the bracket 93 by a wire 109, and the opposite end of the coil is attached to a terminal 110, which terminal is grounded to the frame 41 by one of the screws 95. When the switch 81 is closed, the magnet is energized and attracts the iron armature of the contact bar 103 to the plates 107 for positively maintaining the switch in the closed position as long as the switches 77 and 79 remain closed, regardless of fall in temperature of the bimetal 99. Thus, air will be circulated in the compartment by the fan 23 continuously after the temperature of the liquid from the cooling system of the engine has reached a predetermined degree and until either of the switches 77 or 79 are opened.

The switch 83 comprises a spring strip 111, which is mounted on a bracket 112 that is riveted to the panel 94, and a spring strip 114 mounted on a bracket 115 that is riveted to the panel 94. The strips 111 and 114 each carry a contact 116, which contacts are arranged to close on one another. The strip 111 is normally biased toward the strip 114 and the strip 114 is biased against the periphery of a cam 117. The cam 117 is mounted on the panel 94 by a stud 118 formed on the cam, which stud extends through an opening in the panel and the end is flattened against a washer 119 that is on the stud. Preferably the cam 117 is provided with a slot for receiving a screw driver for rotating the cam. The bracket 112 is connected with the bracket 93 by an arm of the bracket 93. This arm of the bracket 93 forms the conductor 82. The end of the arm forming the conductor 82 extends through an opening in the panel 94 and is connected with the bracket 112. The bracket 115, which forms the conductor 84, includes a terminal post 120 to which the wire 85 leading to the motor 24 is connected.

The brackets 112 and 115 are provided with arms 121 and 122, respectively, which arms extend outwardly between the sides of the U shaped member 72 and parallel with one another. The end portions of arms 121 and 122 are turned outwardly and form terminals to which the ends of the resistance coil 87 are connected. The arm 121 forms the conductor 86.

The switch 83 is operated by the lever 44 through an arm 124 which is riveted to the end of the lever 44. The arm 124 is formed of insulating material and extends through an opening 126 formed in the panel 94. The arm 124 is in alignment with the end portion of the strip 111 and is arranged to engage the strip 111 when the lever 44 is in a position in which the valve is slightly open. Thus when the valve is in a position for permitting a substantial flow of liquid to the heater 12, the switch 83 will be closed, but when the flow of liquid through the valve 27 to the heater 12 is moderate, due to the relatively warm air temperature in the compartment, the switch 83 will be opened. By rotating the cam 117, the positions of the strips 111 and 114 can be changed relative to the end of the arm 124 so that the temperature at which the arm 124 engages the strip 111 can be adjusted.

The panel 94 is enclosed by a sheet metal cover 127 which is arranged to be attached to the walls of the frame 41. The opposite end of the frame 41 is closed by a sheet metal cover 128 which is attached to the walls of the cover by extending lugs 129 formed on the walls 42 of the frame 41 through slots in the cover and then clinching the lugs.

When the air in the passenger compartment of the automobile, is relatively cold, i. e., below 72 degrees F., the valve 27 is open, and liquid from the cooling jacket will be circulated through the pipe 25, valve 27 and pipe 28 to the heater 12 when the engine is started. If the liquid initially circulated is below 110 degrees F., the bimetal strip 99 will maintain the switch 81 open and the fan motor 24 will be inoperative. When the liquid from the cooling jacket of the motor flowing through the valve 27 becomes heated to a temperature of 110 degrees F., for example, the bimetal strip 99 will close the contact bar 103 on the contacts 92 and 96 of the switch and complete the circuit for the motor 24. The switch 83 will be in its closed position since the valve 27 is opened a substantial amount due to the relatively low temperature of the compartment. A circuit for the motor is established from battery 75, wire 76, switch 77, wire 78, switch 79, wire 80, switch 81, conductor 82, switch 83, conductor 84, wire 85, motor 24 and ground. The motor 24 is operated at its maximum speed for circulating air of the compartment rapidly over the heater. As the temperature of the air in the compartment increases, the thermostatic mechanism 40 moves the lever 44 toward the valve closing position for reducing the amount of liquid flowing to the heater 12. When the flow of liquid is reduced to a predetermined amount, the arm 124 opens the switch 83 and the circuit for the motor is modified to constitute the following: battery 75, wire 76, switch 77, wire 78, switch 79, wire 80, switch 81, conductors 82 and 86, resistance 87, wire 85, motor 24 and ground. The resistance 87, causes a reduction in the speed of the motor 24 and consequently the rate of circulation of the air of the compartment through the heater 12 is reduced. The magnet 106 will maintain the switch 81 closed, should the temperature of the bimetal 99 be reduced below 110 degrees F., due to closure of the valve 27, so that circulation of air by the fan 23 will be continuous after the fan is once set in operation. If the temperature of the air in the compartment decreases, the valve will permit a greater flow of liquid to the heater and the switch 83 will be closed and shunt the resistance 87 out of the circuit for the motor 24 for increasing the speed of the fan 23.

By my invention the air within the passenger compartment of the automobile is quickly brought to the desired temperature and that temperature is thereafter maintained substantially uniform.

While the form of embodiment of the present invention as herein disclosed constitutes a preferred form, it is to be understood that other forms might be adopted, all coming within the scope of the claims which follow.

I claim:

1. In a heat exchange system, a heat exchanger; means for circulating a heat exchange fluid through the exchanger; an electrically operated blower for circulating a medium over the exchanger; a circuit for the blower; a second circuit for the blower including a resistance; a thermostatic device responsive to the temperature of the heat exchange fluid for controlling the first mentioned circuit; and means responsive to the temperature of the medium affected by the heat exchanger for connecting the blower in the second mentioned circuit and for controlling the flow of the heat exchange fluid through the exchanger.

2. In a heat exchange system, a heat exchanger; means for circulating a heat exchange fluid through the exchanger; means for circulating a medium over the exchanger; means responsive to a predetermined temperature of the heat exchange fluid for initiating operation of the second mentioned means; and means rendered effective by operation of the third mentioned means for maintaining operation of the second mentioned means regardless of variations in temperature of said fluid.

3. In a heat exchange system, a heat exchanger; means for circulating a heat exchange fluid through the exchanger; an electrically operated blower for circulating a medium over the exchanger; a circuit for the blower; a second circuit for the blower including a resistance; a thermostatic device responsive to the temperature of the heat exchange fluid for controlling the first mentioned circuit; and means responsive to the temperature of the medium affected by the heat exchanger for connecting the blower in the second mentioned circuit and for controlling the flow of the heat exchange fluid through the exchanger, the last mentioned means being effective to connect the blower in the second mentioned circuit while effecting a decrease in the rate of circulation of the heat exchange fluid through the exchanger.

4. In a heat exchange system, a heat exchanger; means for circulating a heat exchange fluid through the exchanger; means for circulating a medium over the exchanger; means operative at a predetermined temperature of the heat exchange fluid for initiating operation of the second mentioned means; and means rendered effective by operation of the third mentioned means for maintaining operation of the second mentioned means although the temperature of the fluid varies from said predetermined temperature.

5. In a heat exchange system, a heat exchanger; means for circulating a heat exchange fluid through the exchanger; electrically energized means for circulating a medium over the exchanger; a circuit for energizing said electrically energized means; a switch for controlling said circuit; a member tending to move according to changes in temperature of the fluid circulating through the heat exchanger for placing said switch in a predetermined condition of operation; and electrically controlled means for maintaining said switch in said predetermined position after being placed therein regardless of the effect of said member on the switch, the last mentioned means being controlled by said switch.

6. In a heat exchange system, a heat exchanger, means for circulating a heat exchange fluid through said exchanger, electrically energized means for circulating a heat transfer medium over said heat exchanger, said means having an electrical circuit, means in said circuit for controlling the operation of said electrically energized means comprising thermally controlled switch means conditioned when said heat exchange fluid is at a predetermined temperature to initiate the operation of said electrically energized means, a second electrically energized means operative when said switch means is in such condition to retain the same in said condition in the event said heat exchange fluid varies from said predetermined temperature, and control means functioning to vary the operation of the first mentioned electrically energized means in response to changes in temperature of said heat transfer medium.

7. In a heat exchange system, a heat exchanger, means for circulating a heat exchange fluid through said exchanger, electrically energized means for circulating a heat transfer medium over said heat exchanger, said means having an electrical circuit, means in said circuit for controlling the operation of said electrically energized means comprising thermally controlled switch means conditioned when said heat exchange fluid is at a predetermined temperature to initiate the operation of said electrically energized means, a second electrically energized means operative when said switch means is in such condition to retain the same in said condition in the event said heat exchange fluid varies from said predetermined temperature, an electrical resistance means and a second thermally controlled switch means for connecting said resistance means in and cutting the same out of said circuit in response to changes in temperature of said heat transfer medium.

8. In a heat exchange system, a heat exchanger, means for circulating a heat exchange fluid through said exchanger, electrically energized means for circulating a heat transfer medium over said heat exchanger, said means having an electrical circuit, means in said circuit for controlling the operation of said electrically energized means comprising thermally controlled switch means conditioned when said heat exchange fluid is at a predetermined temperature to initiate the operation of said electrically energized means, a second electrically energized means operative when said switch means is in such condition to retain the same in said condition in the event said heat exchange fluid varies from said predetermined temperature, an electrical resistance means, a second thermally controlled switch means for connecting said resistance means in and cutting the same out of said circuit in response to changes in temperature of said heat transfer medium, and means for manually changing the effectiveness of said second thermally controlled switch means.

9. In a heat exchange system, a heat exchanger, means for circulating a heat exchange fluid through said exchanger, electrically energized means for circulating a heat transfer medium over said heat exchanger, said means having an electrical circuit, means in said circuit for controlling the operation of said electrically energized means comprising thermally controlled switch means conditioned when said heat exchange fluid is at a predetermined temperature to initiate the operation of said electrically energized means, a second electrically energized means operative when said switch means is in such condition to retain the same in said predetermined temperature, and additional thermally controlled means for simultaneously varying the rate of circulation of the heat exchange fluid through said heat exchanger and the rate of circulation of said heat transfer medium thereover in response to variations in temperature of said heat transfer medium.

ESTEL C. RANEY.